United States Patent [19]

Shopsky

[11] Patent Number: 4,955,583

[45] Date of Patent: * Sep. 11, 1990

[54] VALVE CONSTRUCTION AND METHOD OF MAKING THE SAME

[75] Inventor: Harvey J. Shopsky, Latrobe, Pa.

[73] Assignee: Robertshaw Controls Company, Richmond, Va.

[ * ] Notice: The portion of the term of this patent subsequent to Aug. 11, 2004 has been disclaimed.

[21] Appl. No.: 366,522

[22] Filed: Jun. 15, 1989

Related U.S. Application Data

[62] Division of Ser. No. 192,838, May 11, 1988, Pat. No. 4,856,164, which is a division of Ser. No. 47,205, May 6, 1987, Pat. No. 4,769,887, which is a division of Ser. No. 870,363, Jun. 4, 1986, Pat. No. 4,685,652, which is a division of Ser. No. 794,742, Nov. 4, 1985, Pat. No. 4,651,968.

[51] Int. Cl.⁵ ............................................... F16K 31/70
[52] U.S. Cl. ........................................ 251/11; 137/550; 137/870; 137/883; 60/529; 60/528
[58] Field of Search .................... 251/11; 60/528, 529; 137/870, 883, 550

[56] References Cited

U.S. PATENT DOCUMENTS

| | | | |
|---|---|---|---|
| 2,409,112 | 10/1946 | Dillman | 60/528 X |
| 2,589,614 | 3/1952 | Ireland | 60/529 |
| 4,053,136 | 10/1977 | Perl | 251/11 |
| 4,067,539 | 1/1978 | Perl | 251/11 |
| 4,412,650 | 11/1983 | Young et al. | 251/11 X |

Primary Examiner—Arnold Rosenthal
Attorney, Agent, or Firm—Candor, Candor & Trassone

[57] ABSTRACT

A valve construction and method of making the same are provided, the valve construction comprising a housing, a valve seat carried by the housing, a movable lever carried by the housing and having an opening passing through opposed sides thereof, a valve member for opening and closing the valve seat and having a stem projecting through the opening of the lever whereby the valve member is carried by the lever, and a tubular member disposed in the opening of the lever and telescopically receiving the stem of the valve member therein whereby the tubular member spaces the stem from the lever at the opening thereof.

4 Claims, 6 Drawing Sheets

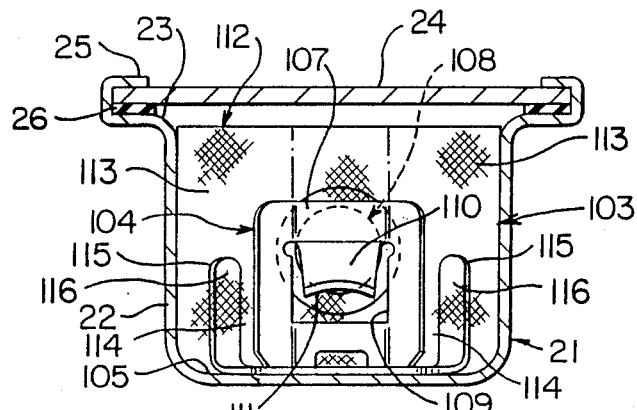
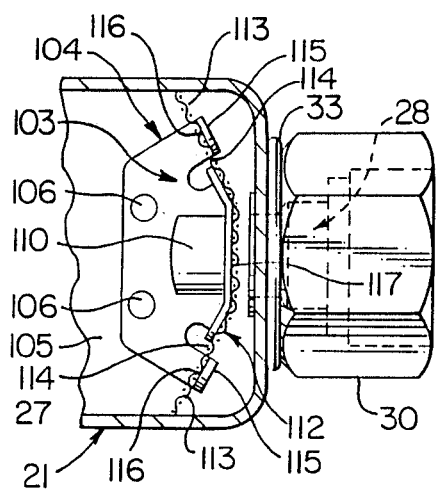
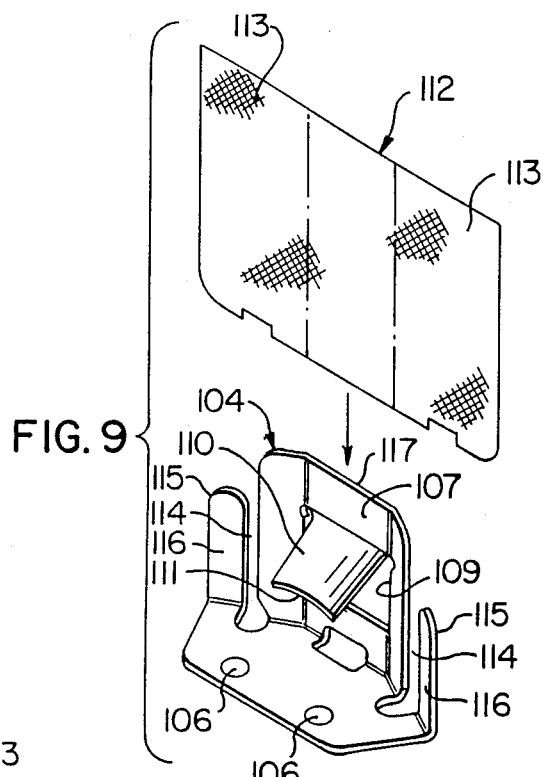
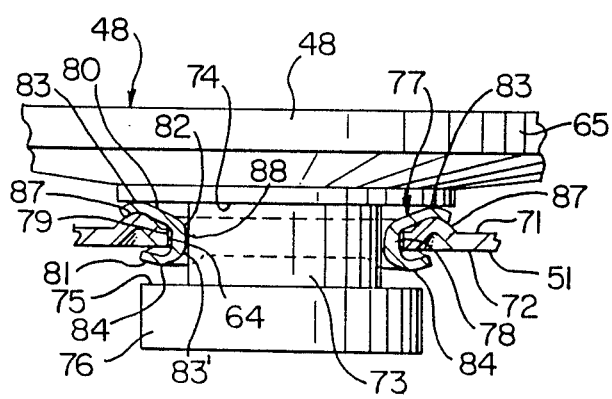

VALVE CONSTRUCTION AND METHOD OF MAKING THE SAME

CROSS REFERENCE TO RELATED APPLICATION

This application is a divisional patent application of its copending parent patent application, Ser. No. 192,838, filed May 11, 1988, now U.S. Pat. No. 4,856,164, which, in turn, is a divisional patent application of its copending parent patent application, Ser. No. 047,205, filed May 6, 1987, now U.S. Pat. No. 4,769,887, which, in turn, is a divisional patent application of its copending parent patent application, Ser. No. 870,363, filed June 4, 1986, now U.S. Pat. No. 4,685,652, which, in turn, is a divisional patent application of its copending parent patent application, Ser. No. 794,742 filed Nov. 4, 1985, now U.S. Pat. No. 4,651,968.

BACKGROUND OF THE INVENTION

1. Field of the Invention

This invention relates to a new valve construction and to a new method of making such a valve construction.

2. Prior Art Statement

It is known to provide a valve construction comprising a housing means, a valve seat carried by the housing means, a movable lever carried by the housing means and having an opening passing through opposed sides of the lever, and a valve member for opening and closing the valve seat and having a stem projecting through the opening of the lever whereby the valve member is carried by the lever. For example, see the Perl, U.S. Pat. No. 4,053,136.

It is also known to provide a valve construction of the above type wherein the tubular member is disposed in the opening of the lever and telescopically received the stem of the valve member therein whereby the tubular member spaced the stem from the lever at the opening thereof, the tubular member having opposed ends respectively defining outwardly directed annular flanges that respectively defining outwardly directed annular flanges that respectively engage against the opposed sides of the lever adjacent the opening thereof and the stem of the valve member defining a pair of spaced apart shoulders on the valve member that respectively are adapted to engage the flanges of the tubular member. For example, see the Davison, U.S. Pat. No. 3,783,893.

It is also known to provide a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part and an ambient temperature compensating bimetallic part, and a valve member carried by the bimetallic lever means for opening and closing the valve seat under the control of the operating part of the bimetallic lever means. For example, see the previously mentioned Perl, U.S. Pat. No. 4,053,136.

It is also known to provide a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part, a heater wire means disposed in coiled relation about the operating part to heat the same when electrical current flows through the heater wire means, and a valve member carried by the bimetallic lever means for opening and closing the valve seat under the control of the operating part of the bimetallic lever means. For example, see the aforementioned Perl, U.S. Pat. No. 4,053,136 and the Schwartz, U.S. Pat. No. 3,442,483.

It is also known to have a tab of a bimetallic lever operatively hold a coiled heater wire means on the bimetallic lever means. For example, see the Dillman, U.S. Pat. No. 2,409,112.

SUMMARY OF THE INVENTION

It is one feature of this invention to provide a new valve construction wherein the valve member thereof is not adversely affected by the opening in the lever means that receives a stem of the valve member therein.

In particular, it was found according to the teachings of this invention that the conventional opening provided through the lever means of a prior known valve construction has punching burrs that tend to damage the stem or neck of the valve member being carried therein and also has a sharp hole edge that tends to cause hangup of the valve member with the lever means.

Accordingly, it was found according to the teachings of this invention that a unique tubular member can be utilized in the opening of the lever means to be disposed intermediate the lever and the stem of the valve member to substantially eliminate the aforementioned problems.

For example, one embodiment of this invention provides a valve construction comprising a housing means, a valve seat carried by the housing means, a movable lever carried by the housing means and having an opening passing through opposed sides of the lever, a valve member for opening and closing the valve seat and having a stem projecting through the opening of the lever whereby the valve member is carried by the lever, and a tubular member disposed in the opening of the lever and telescopically receiving the stem of the valve member therein whereby the tubular member spaces the stem from the lever at the opening thereof.

The tubular member has opposed ends respectively defining outwardly directed annular flanges that respectively engage against the opposed sides of the lever adjacent the opening thereof. The stem of the valve member defines a pair of spaced apart shoulders on the valve member that respectively are adapted to engage the flanges of the tubular member. At least one of the flanges has arcuate projection means thereon that is adapted to be engaged by its respective shoulder of the valve member to tend to permit the valve member to align with the valve seat.

It is another feature of this invention to provide a new valve construction wherein the fluid flow through the valve construction is uniquely directed to the ambient temperature compensating bimetallic part of the movable bimetallic lever means thereof so as to lower its temperature and thus slightly increase the valve opening as a function of fluid flow through the valve construction.

In particular, it was found according to the teachings of this invention that once the bimetallic lever means has moved the valve member to an open condition so as to cause fluid flow therethrough, the directing of the fluid flow so as to contact the ambient temperature compensating part of the bimetallic valve member will cause the bimetallic lever to further open the valve member away from the valve seat.

For example, another embodiment of this invention provides a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part and an ambient temperature compensating bimetallic part, a valve member carried by the bimetallic lever means for opening and closing the valve seat under the control of the operating part of the bimetallic lever means, and deflector means carried by the housing means in the chamber thereof and having opening means therethrough that is aligned with the inlet for receiving a fluid flow from the inlet and for directing the fluid flow from the inlet away from the operating part of the bimetallic lever means and toward the ambient temperature compensating part thereof to tend to cool the ambient temperature compensating part when fluid flows through the chamber from the inlet through the outlet.

It is another feature of this invention to provide a new valve construction wherein the heater wire means and the bimetallic lever means that carries the heater wire means are uniquely arranged.

In particular, it was found according to the teachings of this invention that the heater wire means can be held on the bimetallic lever means by a tab of the bimetallic lever means.

For example, another embodiment of this invention provides a valve construction comprising a housing means provided with a chamber therein and with an inlet leading to the chamber and an outlet leading from the chamber, a valve seat carried by the housing means and leading to the outlet, a movable bimetallic lever means carried by the housing means and having an operating bimetallic part, a heater wire means disposed in coiled relation on the operating part to heat the same when an electrical current flows through the heater wire means, and a valve member carried by the bimetallic lever means for opening and closing the valve seat under the control of the operating part of the bimetallic lever means, the operating part of the bimetallic lever means having a tab extending therefrom and being operatively interconnected to the heater wire means to tend to hold the heater wire means in the coiled relation on the operating part of the bimetallic lever means. The heater wire means comprises a length of the wire means doubled upon itself to define a looped end and a pair of free ends adjacent each other with the looped end being hooked over the tab or being disposed under the tab.

Accordingly, it is an object of this invention to provide a new valve construction having one or more of the novel features of this invention as set forth above or hereinafter shown or described.

Another object of this invention is to provide a new method of making such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 7 is a cross-sectional view taken substantially on the line 7—7 of FIG. 4.

FIG. 8 is a fragmentary view similar to FIG. 4 with the bimetallic lever means and its mounting structure removed.

FIG. 9 is an exploded perspective view illustrating the deflector means and filter screen of the valve construction of FIG. 1.

FIG. 10 is an enlarged, fragmentary cross-sectional view taken on line 10—10 of FIG. 4.

DESCRIPTION OF THE PREFERRED EMBODIMENTS

Figure 1:
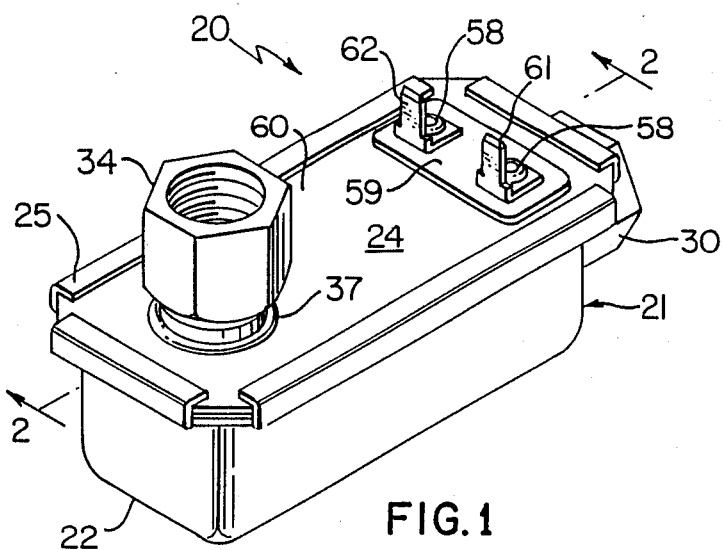
FIG. 1 is a top perspective view of one embodiment of the new valve construction of this invention.

While the various features of this invention are hereinafter illustrated and described as being particularly adapted to provide a valve construction to provide a flow of gaseous fuel to a burner means of a cooking apparatus or the like, it is to be understood that the various features of this invention can be utilized singly or in various combinations thereof to provide a valve construction for supplying other types of fluid for other apparatus as desired.

Therefore, this invention is not to be limited to only the embodiments illustrated in the drawings, because the drawings are merely utilized to illustrate one of the wide variety of uses of this invention.

Referring now to FIGS. 1, 2 and 4–14, one embodiment of the new valve construction of this invention is generally indicated by the reference numeral 20 and comprises a housing means 21 formed from a metallic cup-shaped housing part 22 having an open end 23 closed by another metallic housing member 24 that is held in place by a turned over flange means 25 of the housing member 22 and is sealed in place by a sealing gasket means 26 so as to provide a substantially fluid-tight chamber 27 in the housing means 21.

The housing means 21 has an inlet 28 leading to the chamber means 27 and an outlet 29 leading from the chamber means 27. The inlet means 28 is defined by a tubular inlet fitting 30 having a part 31 telescopically disposed in an opening 32 in the housing member 22 and being secured to the housing member 22 by welding, brazing or other suitable means as indicated by the reference numeral 33 in FIG. 2. Similarly, the outlet means 29 comprises an outlet fitting 34 having a tubular portion 35 thereof disposed in an opening 36 through the housing member 24 and being secured thereto in its assembled relation by welding, brazing, etc. as indicated by the reference numeral 37.

The fittings 30 and 34 are formed of metallic material and respectively have internally threaded ends 38 and 39 to be respectively fluidly interconnected to conduit means 40 and 41, the conduit means 40 leading from a fluid source 42, such as a gaseous fuel source, and the conduit means 41 leading to an output device 43, such as a gaseous burner means 43 of a cooking apparatus (not shown) or the like.

A metallic tubular valve seat member 44 has an externally threaded end 45 threadedly disposed in an internally threaded portion 46 of the outlet fitting 34 so as to provide for axial adjustment therebetween, the tubular valve seat member 44 having an annular valve seat 47 that projects into the chamber 27 to be opened and closed by a movable valve member 48 in a manner hereinafter set forth, the valve seat member 44 being sealed to the outlet fitting 34 by an annular sealing means 49 that permits axial movement between the valve seat member 44 and the outlet fitting 34 so as to provide for adjustment of the annular valve seat 47 relative to the housing means 21 for a purpose well known in the art.

The valve member 48 is formed of a suitable polymeric material and is carried by a bimetallic lever means that is generally indicated by the reference numeral 50 and comprises an ambient temperature compensating bimetallic member 51 having opposed ends 52 and 53 and an operating bimetallic member or part 54 having opposed ends 55 and 56, the ends 53 and 55 of the bimetallic parts 51 and 54 being secured together in any suitable manner, such as by spot welding, whereby the other ends 52 and 56 of the bimetallic parts 51 and 54 define the opposed ends of the bimetallic lever means 50.

Figure 2:
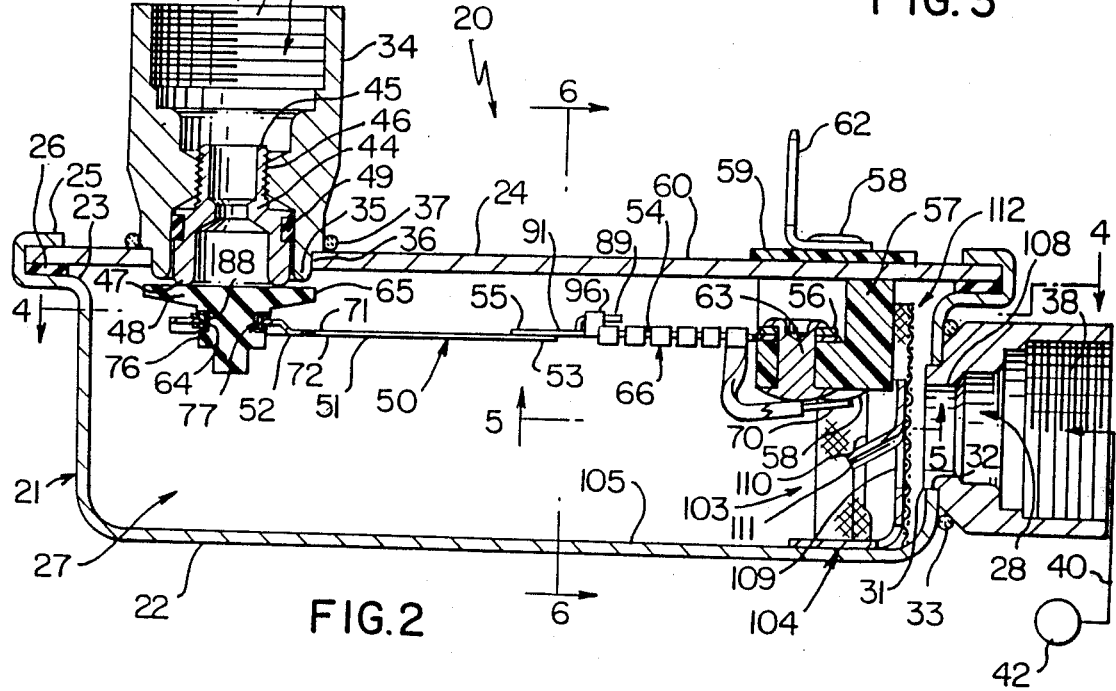
FIG. 2 is an enlarged cross-sectional view taken on line 2—2 of FIG. 1.

The end 56 of the bimetallic lever means 50 is secured to an electrically insulating support means 57 that is secured to the housing member 24 by metallic rivet means 58 that also secure an insulating member 59 against the outer surface 60 of the housing means 21 as illustrated in FIG. 2. The rivet means 58 also secure a pair of terminals 61 and 62 against the insulating member 59 so that suitable external leads, not shown, can be respectively electrically interconnected to the terminals 61 and 62 and thereby be electrically interconnected to the fastening rivets 58 that lead into the housing chamber 27 for a purpose hereinafter described.

The end 56 of the bimetallic lever means 50 is secured to the electrically insulating support 57 by a rivet means 63 as illustrated in FIG. 2 whereby the bimetallic lever means 50 is cantilever mounted in the chamber 27 of the housing means 21 and the free end 52 thereof carries the valve member 48 in an opening means 64 in the end 52 of the bimetallic lever means 50 in a manner hereinafter set forth whereby the valve member 48 is adapted to open and close the valve seat 47 in a manner hereinafter set forth, the normal biasing force of the bimetallic lever means tending to maintain the enlarged disclike end 65 of the valve member 48 in sealing relation against the annular valve seat 47 to prevent fluid flow through the valve construction 20. Also, it can be seen that the pressure of the fuel in the chamber 27 from the source 42 also will tend to normally hold the valve member 48 in its closed condition against the valve seat 47.

A heater wire means 66 is disposed in coiled relation on the operating part 54 of the bimetallic lever means 50 and comprises a conductive ribbon or wire 67 covered by electrically insulating material 68 in a conventional manner while the opposed ends 69 and 70 of the wire means 67 extend from the insulating means 68 and are respectively secured by soldering or the like to the rivets 58 that are electrically interconnected to the terminals 61 and 62 whereby an electrical current is adapted to pass through the heater wire means 66 to heat the operating part 54 of the bimetallic lever means 50 and thereby cause the same to warp in such a manner that the valve member 48 is moved away from the valve seat 47 so that fuel can flow from the source 42 to the burner means 43 through the valve construction 20 as long as the heater wire means 66 is so heating the operating part 54 of the bimetallic lever means 50 to cause such a warped condition of the bimetallic lever means 50 in a manner well known in the art.

When current ceases to flow through the heater wire means 66, the operating part 54 of the bimetallic lever means 50 cools and unwarps so that the natural force of the cooled bimetallic lever means 50 is to hold the valve member 48 sealed against the valve seat 47 in the closed condition thereof so as to prevent fluid flow through the valve construction 20 from the source 42 to the burner means 43 in a manner well known in the art.

For example, see the aforementioned Perl, U.S. Pat. No. 4,053,136 which illustrates and describes such an electrically operated valve construction for directing fuel from a source to a main burner means each time an electrical control system causes an electrical current to flow through the heater wire means disposed on the operating part of the bimetallic lever means whereby this patent is being incorporated into this disclosure by this reference thereto.

Therefore, a further discussion of the use and operation of the valve construction 20 is deemed not necessary as such use and operation is well known in the art whereby the unique features of this invention will now be described.

As previously stated, one of the features of this invention is to provide a unique mounting arrangement of the valve member 48 on the bimetallic lever means 50 so as to protect the same from any burrs and/or sharp corners that result from a punching of the opening 64 through the opposed sides 71 and 72 of the end 52 of the ambient temperature compensating bimetallic part 51 of the bimetallic lever means 50.

In particular, the valve member 48 comprises a one-piece structure formed from polymeric material so as to make the disc end 65 thereof sufficiently resilient to fully seal against the annular valve seat 47 of the valve seat member 44 in a manner well known in the art, the valve member 48 having a cylindrical stem or neck 73 that passes through the opening 64 in the bimetallic lever means 50 and defining enlarged annular shoulders 74 and 75 on opposite sides of the neck or stem 73 for respectively being trapped by the opposite sides 71 and 72 of the bimetallic lever means 51 after an enlarged end 76 of the valve member 48 has been snap-fitted through the opening 64 in a manner well known in the art. In this manner, the valve member 48 is carried by the bimetallic lever means 50.

However, a unique tubular member or eyelet-like member of this invention that is generally indicated by the reference numeral 77 is utilized to protect the valve member 48 in its mounted relation in the opening 64 of the bimetallic lever means 50 as the tubular member 77 of this invention is substantially eyelet shaped and thereby has a tubular part 78 disposed in the opening 64 so as to be disposed between the edge 79 of the opening 64 and the stem 73 of the valve member 48 and has two outwardly turned annular flange-like parts 80 and 81 integrally joined to opposed ends 82 and 83' of the tubular part 78 so as to be respectively disposed against the opposed sides 71 and 72 of the bimetallic lever means 51 and thereby provide smooth arcuate surfaces for engagement with the shoulders 74 and 75 of the valve member 48 in the manner illustrated in FIG. 10. In this manner, it can be seen that the valve member 48 is fully protected by the member 77 of this invention from any burrs on the edge of the opening 64 as well as protected from any sharp corners on the bimetallic lever means 50 at the opening 64 thereof.

Figure 12:
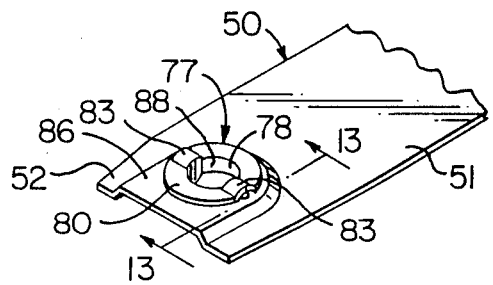
FIG. 12 is a view similar to FIG. 11 and illustrating the eyelet and the bimetallic lever means assembled together.

In order to permit the valve member 48 to rock relative to the end 52 of the bimetallic lever means 50 to thereby cause the disc end 65 to fully seat against the annular valve seat 47 and thereby compensate for the array of eyelet attitudes that can be assumed by the lever end 52 during opening and closing of the valve member 48 under various operating conditions as dictated by ambient temperature and current level, the upper annular shoulder 80 is provided with two diametrically opposed annular projections 83 as illustrated in FIGS. 10 and 12 which engage against the shoulder 74 and provide contact with the annular shoulder 74 on a line across the valve disc 65 regardless of the lever and eyelet attitude, two like arcuate projections 84 being provided on the lower flange means 81 thereof for cooperating with the annular shoulder 75 of the valve member 48 in the same manner. However, as illustrated in FIG. 10, it can be seen that the spacing between the shoulders 74 and 75 of the valve member 48 is greater than the spacing between the arcuate projections 83 and 84 on the tubular member 78 so as to permit axial movement of the stem 73 in the opening 64 to provide means for compensating for any misalignment with the valve seat 47 as previously set forth as well as provide a means for creating a "pop open" action of the valve member 48.

For example, the eyelet 77 is essentially parallel with the valve seat 47 when the valve disc 65 initially begins to open with the projections 84 pushing downwardly on the shoulder 75 of the valve member 48 and the spacing between the shoulders 74 and 75 permits the valve disc 65 to drop until the shoulder 74 hits the projections 83 to create a greater valve opening as the generated bimetal force overcomes the disc force created by the gas pressure tending to hold the disc 65 closed against the valve seat 47. Thus, the dropping valve member 48 creates a "pop open" action.

Figure 11:
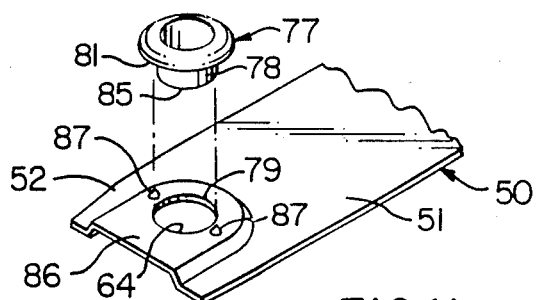
FIG. 11 is a fragmentary exploded perspective view illustrating the bimetallic lever means and an eyelet part thereof before the same are assembled together.
Figure 13:
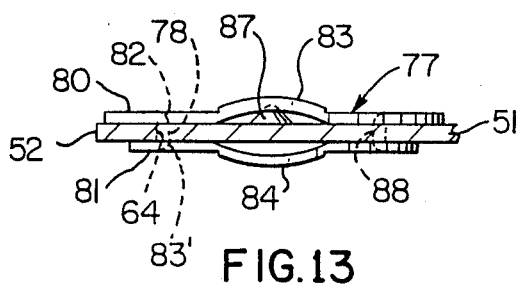
FIG. 13 is an enlarged, fragmentary cross-sectional view taken on line 13—13 of FIG. 12.

One method of this invention for forming the valve construction 20 with the unique tubular member 77 is illustrated in FIGS. 11-13 wherein the tubular member 77 initially has the tubular portion 78 non-flared on the end 85 thereof so that the end 85 can be readily inserted through the opening 64 in the end 52 of the ambient temperature compensating part 51 of the bimetallic lever means 50 in the manner illustrated in FIG. 11, the end 52 of the bimetallic part 51 having been prestamped to define an annular area 86 adjacent the opening 64 and being provided with two outwardly directed substantially pointed projections 87 which will assure that the arcuate projections 83 will be formed on the flange 80 when the end 85 is subsequently turned over against the underside of the area 86 of the bimetallic part 51 in the manner illustrated in FIGS. 12 and 13. The annular flange 80 on the member 77 is initially cup-shaped throughout the entire annular area as illustrated in FIG. 11 and during the turning over operation of the end 85 thereof in the manner illustrated in FIGS. 12 and 13 to form the projections 84, the annular flange 80 is substantially flattened except for the projection areas 83 thereof as illustrated in FIG. 13 as controlled by the pointed projections 87, the projections 87 assuring that the projections 83 are disposed on a line that is substantially transverse to the longitudinal axis of the lever means 50 and prevent rotation of the eyelet 77 in the opening 64 once the eyelet 77 has been formed in place as the projections 77 now mate with the projections 83.

Thus, it can be seen that it is a relatively simple method of this invention to provide the eyelet-like part 77 in the opening 64 of the bimetallic lever means 50 so as to protect the valve member 48 not only during the insertion of the enlarged end 76 thereof through the resulting opening 88 in the eyelet-like member 77 so as to snap-fit the valve member 48 in the opening 64 of the lever means 51, but to also provide the smooth surface means between the opening 64 of the lever means 51 and the opposed sides 71 and 72 thereof as defined by the tubular part 78 and the flanges 80 and 81 of the tubular member 77 of this invention.

As previously stated, it is another feature of this invention to provide unique means for mounting the heater wire means 66 on the operating part 54 of the bimetallic lever means 50 of the valve construction 20.

Figure 14:
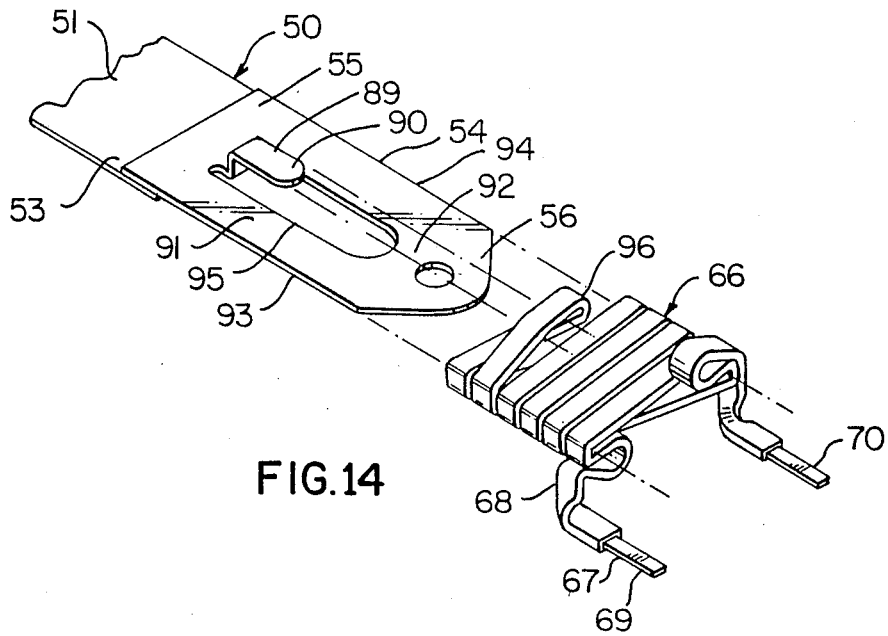
FIG. 14 is a fragmentary exploded perspective view illustrating the bimetallic lever means and the heater wire means therefor.

In particular, it can readily be seen in FIG. 14 that the operating bimetallic part 54 of the bimetallic lever means 50 has a tab 89 bent therefrom so as to define a flat portion 90 of the tab 89 in such a manner that the same is spaced from the side 91 of the part 54 while being substantially parallel to the longitudinal axis 92 of the bimetallic lever means 50 and parallel to and intermediate the opposed side edges 93 and 94 of the part 54 as illustrated. If desired, the tab 89 can be carved from the bimetallic part 54 while forming a central opening 95 therethrough in the manner illustrated in FIG. 14.

The wire means 66 can be preformed into the coiled condition illustrated in FIG. 14 to be slipped onto the bimetallic part 54 or could be coiled on the bimetallic part 54 as desired.

Figure 4:
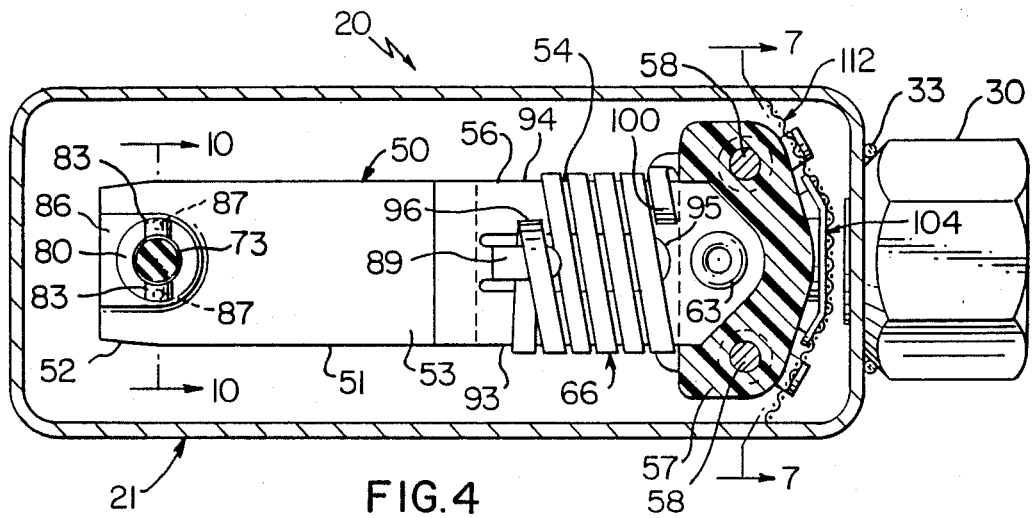
FIG. 4 is a cross-sectional view taken substantially on line 4—4 of FIG. 2.
Figures 4A, 5:
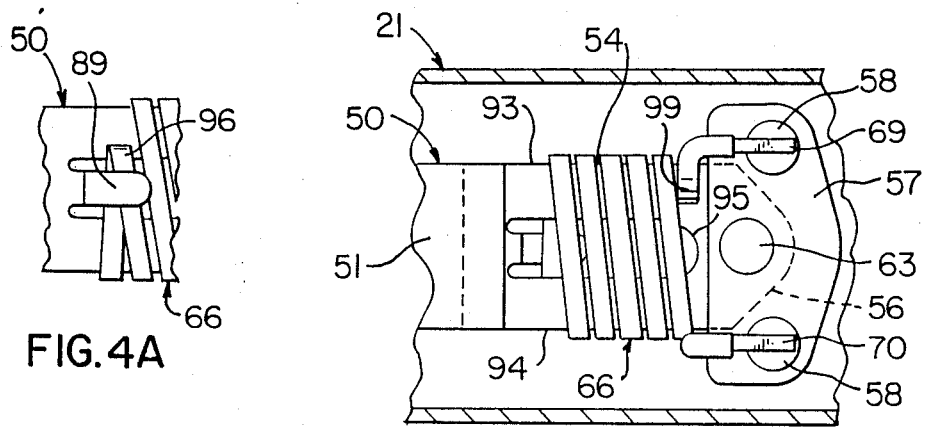
FIG. 4A is a view similar to FIG. 4 and illustrates another arrangement of the heater wire and bimetal lever means of this invention.
FIG. 5 is a fragmentary cross-sectional view taken on line 5—5 of FIG. 2.
Figure 6:
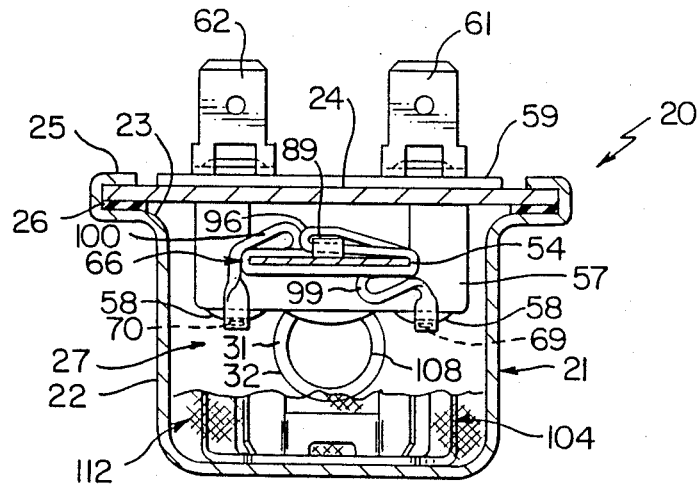
FIG. 6 is a cross-sectional view taken substantially on line 6—6 of FIG. 2 with certain parts being broken away.

In any event, it can be seen that the heater wire means 66 is folded back upon itself to define a looped end 96 that is adapted to be hooked over the tab 89 in the manner illustrated in FIG. 4 or be disposed beneath the tab 89 in the manner illustrated in FIG. 4A and have two like portions 97 and 98 thereof coiled in unison about the part 54 until the same define the free ends 69 and 70 thereof, the ends 69 and 70 each being looped back upon itself in the area of the reference numerals 99 and 100 to respectively extend over the opposed edges 93 and 94 of the part 54 of the bimetallic lever means 50. In this manner, the folded back parts 99 and 100 of the heater wire means 66 respectively hold the short loops 101 and 102 over the respective edges 93 and 94 of the bimetallic part 54 to keep the last half turns 101 and 102 hugging against the bimetallic part 54. In a similar manner, the raised tab 89 that captures the folded end 96 likewise holds the heater wire 66 against the bimetallic part 54 at the other end of the heater wire 66 regardless of whether the end 96 is hooked to the tab 89 as illustrated in FIG. 4 or is retained beneath the tab 89 as illustrated in FIG. 4A.

As illustrated in FIG. 14, the heater wire means 66 can be precoiled and bent into the configuration illustrated in FIG. 14 and then can be readily slipped onto the bimetallic part 54 to have the folded end 96 hooked to the tab 89 or inserted beneath the tab 89 and the folded over parts 99 and 100 respectively extend from the side edges 93 and 94 of the part 54 so that the ends 69 and 70 can be readily secured, such as by soldering or the like, to the rivets 58 so as to be thereby electrically interconnected to the terminals 61 and 62.

In this manner, it can be seen that the ends 69 and 70 of the heater wire means 66 extend from the same end of the bimetallic lever means 50 and do not require any electrical current to flow through the bimetallic lever means 50. Such an arrangement for not having a current flow through the bimetallic member appears to be provided in the aformentioned Schwartz, U.S. Pat. No. 3,442,483 whereby this patent is being incorporated into this disclosure by this reference thereto.

Therefore, it can be seen that it is a unique method of this invention to either form the heater wire means 66 on the bimetallic part 54 by hooking the folded end 96 over the tab 89 or inserting the folded end 96 under the tab 89 and then winding the parts 97 and 98 in side-by-side relation about the part 54 until the ends 99 and 100 are looped or to preform the heater wire means 66 in the configuration illustrated in FIG. 14 and then slip the same onto the bimetallic part 54 so that the end 96 is hooked over the tab 89 or under the tab 89 as previously set forth.

In any event, it can be seen that when an electrical current flows through the heater wire means 66, the same heats the operating part 54 of the bimetallic lever means 50 to cause the same to warp in the manner previously described and for the purpose previously described.

As previously set forth, it is another feature of this invention to provide means that will direct the fluid flow from the inlet 28 away from the operating part 54 of the bimetallic lever means 50 and onto the ambient temperature compensating part 51 thereof so as to cool the part 54 during the flow of fluid through the valve construction 20.

Such unique means of this invention for accomplishing this purpose is generally indicated by the reference numeral 103 in the drawings and comprises a deflector member 104 formed of metallic material and fastened in place against the closed end wall 105 of the housing member 22 by any suitable securing means, such as by spot welding 106, etc.

The deflector member 104 can comprise a one-piece member suitably stamped and bent into the configuration illustrated in FIG. 9 so that the same has a deflector part 107 which spans an inlet opening 108 of the inlet fitting 30 and is provided with an opening 109 therethrough which aligns with the opening 108 of the inlet fitting 30. A deflector tab 110 is bent from the deflector part 107 and so angled that the fluid flow coming from the inlet fitting 30 through the opening 109 in the deflecting part 107 will engage against the arcuate surface 111 of the deflector tab 110 and be directed away from the operating part 54 of the bimetallic lever means 50 and down against the closed end wall 105 of the housing member 22 so as to bounce off of the same at an angle that will cause the flow to be directed against and over the ambient temperature compensating bimetallic part 51 of the lever means 50 before that fluid flow will pass out through the opened valve seat 47 when the bimetallic lever means 50 has the valve member 48 in an open condition thereof. It is obvious that no fluid flow occurs in such a manner when the valve member 48 is in its closed condition even though the source 42 is always interconnected to the inlet fitting 30 so as to provide fluid within the chamber 27 of the valve construction 20 in a manner well known in the art.

In this manner, since the fluid flow through the valve construction 20 occurs when the valve member 48 has been moved to an open condition by the heater wire means 66 heating the operating part 54 of the bimetallic lever means 50 in the manner previously set forth. Such cooling flow of fluid onto the part 51 of the bimetallic lever means 50 lowers its temperature and causes the part 54 to warp in an open direction so as to increase the opening of the valve member 48 away from the valve seat 47 as it is well known that a compensating bimetallic part of a bimetallic lever means warps in the opposite direction from the operating part thereof upon the heating or the cooling thereof. In this manner, the further opening of this valve member 48 away from the valve seat 47 is a function of gas flow through the valve construction 20. Also, by directing this gas flow away from the operating part 54 of the bimetallic lever means 50, this cooling effect will not cause the operating part 54 to tend to warp slightly in the closing direction.

If desired, a filter screen 112 can be carried by the deflector means 103 so as to span the opening 109 thereof to screen or filter the fluid flow through the valve construction 20, such screen or filtering arrangements normally being provided in the inlet fitting of the prior known valve constructions and not in the internal chambers thereof as provided by the screen 112 of this invention.

In particular, the screen 112 can be formed of any suitable material and can be folded into the configuration illustrated in the drawings so as to have end parts 113 thereof disposed through slot means 114 defined between the deflecting part 107 of the deflector member 104 and upstanding legs 115 thereof so as to be disposed against the side 116 of the legs 115 and against the opposite side 117 of the deflector portion 107 as illustrated in the drawings whereby the screen 112 is fully carried by the deflector means 103 to screen the fluid flow through the opening 109 of the deflector means 107 as such fluid flow occurs upon the opening of the valve member 48 in the manner previously set forth.

Therefore, it can be seen that it is a relatively simple method of this invention to provide the deflector means 103 by forming the deflector member 104 into the configuration illustrated in the drawings and fasten the same inside the housing means 21 in any suitable manner so that the opening 109 thereof will be aligned with the opening 108 of the inlet fitting 30 and to insert the screen 112 about the legs 115 and deflector portion 107 so as to cover the opening 109 to filter the fluid flow therethrough as previously set forth.

While the valve construction 20 has been illustrated and described as having particular shaped inlet and outlet fittings 30 and 34, it is to be understood that other fittings can be utilized if desired.

Figure 3:
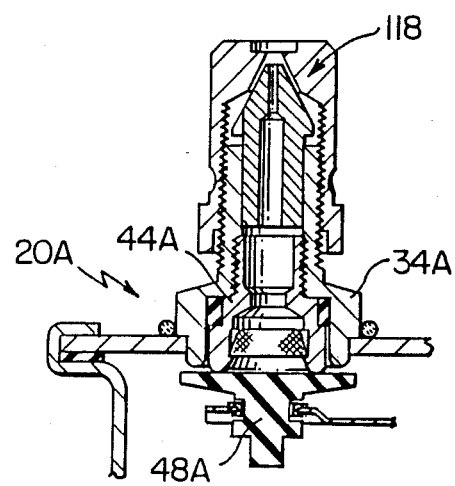
FIG. 3 is a fragmentary view similar to FIG. 2 and illustrates another embodiment of the new valve construction of this invention.

For example, reference is now made to FIG. 3 wherein another outlet fitting 34A is provided for the valve construction 20A which has the parts thereof similar to the parts of its valve construction 20 indicated by like reference numerals followed by the reference letter "A".

As illustrated in FIG. 3, the valve seat member 44A and the valve member 48A of the valve construction 20A are substantially the same as the members 44 and 48 previously described. However, the outlet fitting 34A has an adjustable needle valve arrangement 118 on the outer end thereof with the needle valve arrangement 118 being conventional in the art and being utilized for adjusting the fluid flow therethrough as is well known in the art.

Also, while the valve construction 20 of this invention has been previously illustrated and described as having only one operating lever means 50 and one outlet therefor, it is to be understood that the same can be provided with a pair of outlets and a pair of bimetallic lever means for such outlets so that the resulting valve construction can be utilized for a double burner arrangement in a manner well known in the art and as set forth in the aforementioned Schwartz, U.S. Pat. No. 3,442,483.

For example, reference is now made to FIGS. 15-18 wherein another valve construction of this invention is generally indicated by the reference numeral 20B and parts thereof similar to the valve construction 20 previously described are indicated by like reference numerals followed by the reference letter "B".

Figure 15:
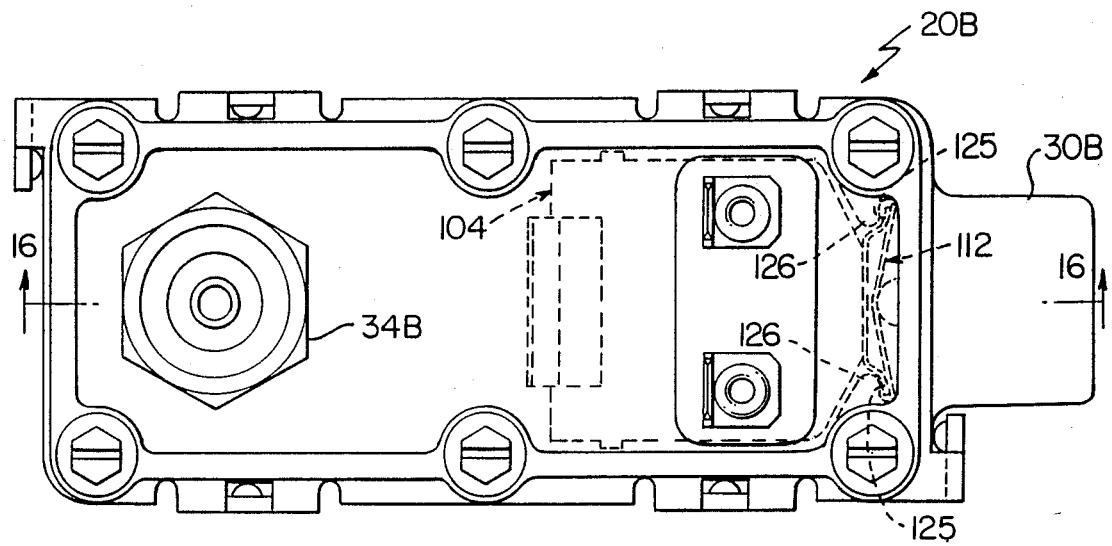
FIG. 15 is a top view of another embodiment of the new valve construction of this invention.
Figure 16:
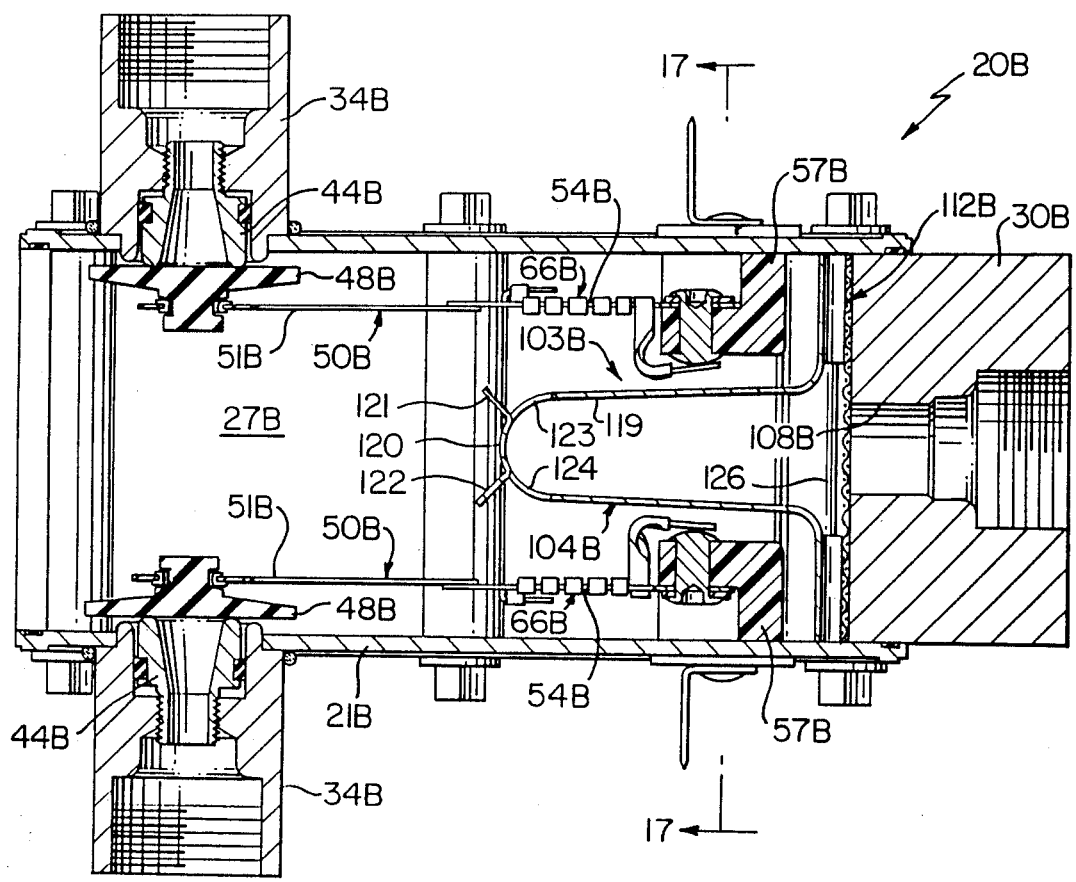
FIG. 16 is a cross-sectional view taken on line 16—16 of FIG. 15.
Figure 17:
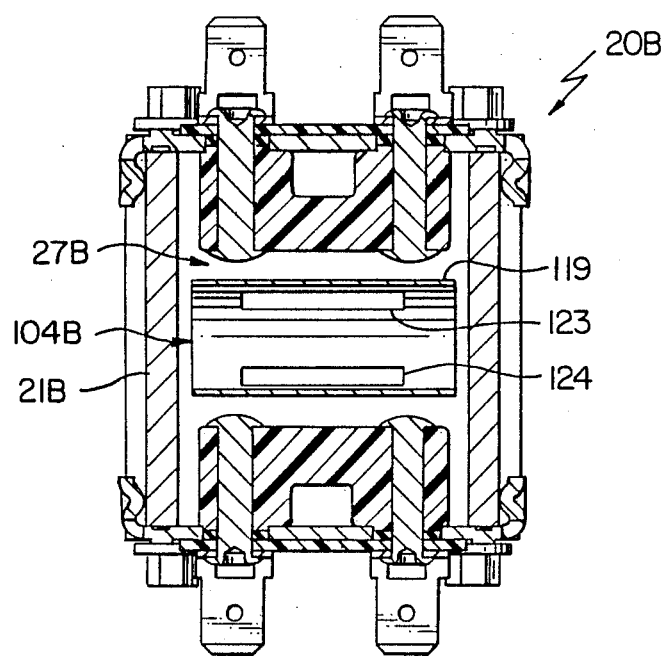
FIG. 17 is a cross-sectional view taken on line 17—17 of FIG. 16.
Figure 18:
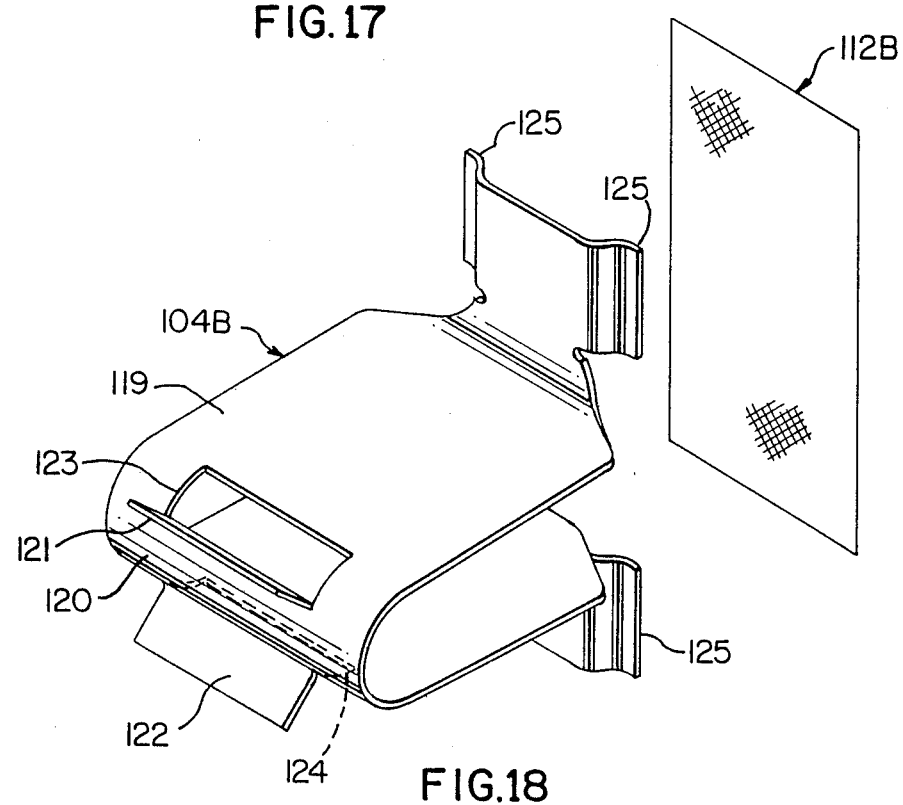
FIG. 18 is an exploded perspective view of the deflector means and filter screen of the valve construction of FIG. 15.

As illustrated in FIGS. 15-17, it can be seen that the valve construction 20B has the housing means 21B thereof so constructed and arranged that the same has two opposed outlet fittings 34B respectively carrying two tubular valve seat members 44B which are adapted to be respectively opened and closed by two valve members 48B respectively carried by two like bimetallic lever means 50B that are respectively mounted to mounting means 57B secured to the housing means 21B in the manner previously set forth.

However, the inlet fitting 30B for the valve construction 20B is so arranged that the opening 108B thereof is disposed substantially equally between the bimetallic lever means 50B so that the fluid flow out of the opening 108B would be parallel to the operating levers 50B but intermediate the same.

A deflector means 103B of this invention for the valve construction 20B comprises a deflector member 104B that is so shaped that the same defines a confining tubular like portion 119 that terminates in an arcuate end portion 120 which has a pair of tabs 121 and 122 respectively carved therefrom and respectively defining openings 123 and 124 adjacent the bimetallic lever means 50B, the tabs 121 and 122 being so constructed and arranged that the same deflect the fluid flow out of the openings 123 and 124 respectively to the ambient temperature compensating parts 51B of the bimetallic lever means 50B while the tubular part 119 of the deflector means 104B maintains the flow of fluid through the deflector means 104B away from the operating parts 54B of the bimetallic lever means 50B. In this manner, it can be seen that the deflector member 104B causes the bimetallic parts 51B to operate in the same manner as the part 51 previously described so that such operation will not be repeated.

The screen 112B of the valve construction 20B is disposed across the inlet fitting 30B and can be held in place by suitably shaped legs 125 on the deflector means 104B in the manner illustrated in FIGS. 15 and 16 wherein the legs 125 are disposed or slipped behind housing projections 126 in a dovetailing manner.

Thus, it can readily be seen that it is a relatively simple method of this invention to form the deflector means 104B from a single metallic member by a suitable stamping and bending operation so that the openings 123 and 124 and tabs 121 and 122 can be formed in the configuration illustrated in the drawings so as to cause the fluid flow that enters into the chamber 27B of the valve construction 20B upon the opening of the respective valve member 48B to flow out of the openings 123 and 124 against the ambient temperature compensating parts 51B of the levers 50B for the reasons previously set forth for the valve construction 20. Of course, only one bimetallic lever means 50B can be operated and it will have its ambient temperature compensating bimetallic part 51B cooled by the fluid flow as previously described.

Therefore, it can be seen that this invention not only provides a new valve construction, but also this invention provides a new method of making such a valve construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a valve construction comprising a housing means provided with a chamber therein and with an inlet leading to said chamber and an outlet leading from said chamber, a valve seat carried by said housing means and leading to said outlet, a movable bimetallic lever means carried by said housing means and having an operating bimetallic part, a heater wire means disposed in coiled relation about said operating part to heat the same when an electrical current flows through said heater wire means, and a valve member carried by said bimetallic lever means for opening and closing said valve seat under the control of said operating part of said bimetallic lever means, said operating part of said bimetallic lever means having a fastening means operatively interconnected to said heater wire means to tend to hold said heater wire means in said coiled relation on said operating part of said bimetallic lever means, the improvement wherein said heater wire means comprises a length of said wire means doubled upon itself to define a looped end and a pair of free ends adjacent each other with said looped end being said part of said heater wire means that is operatively interconnected to said fastening means of said bimetallic lever means.

2. A valve construction as set forth in claim 1 wherein said doubled length of wire means has two portions thereof disposed in side-by-side relation between said looped end and said free ends, said two portions being disposed in coiled relation about said operating part of said bimetallic lever means.

3. A valve construction as set forth in claim 2 wherein each said free end of said wire means is folded back upon itself as it extends from said operating part of said bimetallic lever means.

4. A valve construction as set forth in claim 1 wherein said operating part of said bimetallic lever means has opposed side edges that are substantially parallel to each other and to said longitudinal axis of said bimetallic lever means, said fastening means being disposed intermediate said side edges.

* * * * *